United States Patent
Flynn et al.

(10) Patent No.: US 11,692,930 B2
(45) Date of Patent: Jul. 4, 2023

(54) STANDOFF INSPECTION USING GEOMETRY-INFORMED FULL-WAVEFIELD RESPONSE MEASUREMENTS

(71) Applicant: Triad National Security, LLC, Los Alamos, NM (US)

(72) Inventors: Eric Brian Flynn, Santa Fe, NM (US); Peter Hans Fickenwirth, Los Alamos, NM (US); Matthew James Adams, Santa Fe, NM (US)

(73) Assignee: Triad National Security, LLC, Los Alamos, NM (US)

( * ) Notice: Subject to any disclaimer, the term of this patent is extended or adjusted under 35 U.S.C. 154(b) by 935 days.

(21) Appl. No.: 16/533,159

(22) Filed: Aug. 6, 2019

(65) Prior Publication Data

US 2021/0041352 A1  Feb. 11, 2021

(51) Int. Cl.
| | | |
|---|---|---|
| *G01N 21/17* | (2006.01) | |
| *G01S 17/08* | (2006.01) | |
| *G01N 21/88* | (2006.01) | |
| *G01S 17/89* | (2020.01) | |
| *G01N 29/04* | (2006.01) | |
| *G01N 29/11* | (2006.01) | |

(Continued)

(52) U.S. Cl.
CPC ..... *G01N 21/1702* (2013.01); *G01N 21/8806* (2013.01); *G01N 29/04* (2013.01); *G01N 29/041* (2013.01); *G01N 29/11* (2013.01); *G01N 29/46* (2013.01); *G01S 17/08* (2013.01); *G01S 17/89* (2013.01); *G01H 9/00* (2013.01); *G01N 2021/1706* (2013.01)

(58) Field of Classification Search
CPC .......... G01N 21/1702; G01N 21/8806; G01N 29/04; G01N 29/041; G01N 29/11; G01N 29/46; G01N 29/2418; G01N 2021/1706; G01S 17/08; G01S 17/89; G01S 17/86; G01H 9/00
See application file for complete search history.

(56) References Cited

U.S. PATENT DOCUMENTS

| | | |
|---|---|---|
| 6,393,384 B1 | 5/2002 | Anthony |
| 9,880,133 B1 | 1/2018 | Stephanou |
| 10,794,836 B1 | 10/2020 | Flynn |

(Continued)

OTHER PUBLICATIONS

PCT Search Report and Written Opinion for Application No. PCT/US2021/054012, dated Feb. 3, 2022 (9 pages).
Stull, et al. On the Theoretical Limitations in Estimating Thickness of a Plate-Like Structure From a Full-Field Single-Tone Response Lamb Wave Measurement, Los Alamos National Laboratory, Sep. 2017 (16 pages).

(Continued)

*Primary Examiner* — Suman K Nath
(74) *Attorney, Agent, or Firm* — Esplin & Associates, PC

(57) ABSTRACT

A vibrometer may measure acoustic responses in portions of a structure along a scan path to acoustic excitation of the structure. A ranging device may measure distances to the portions of the structure along the scan path. A three-dimensional point cloud may be generated based on the acoustic responses in the portions of the structure and the distances to the portions of the structure. The three-dimensional point cloud may include points representing geometry of the portions of the structure. The points may be associated with the acoustic responses in corresponding portions of the structure. One or more properties of the structure may be determined based on an analysis of the three-dimensional point cloud.

20 Claims, 9 Drawing Sheets

(51) Int. Cl.
  *G01N 29/46* (2006.01)
  *G01H 9/00* (2006.01)

(56) References Cited

U.S. PATENT DOCUMENTS

| | | | |
|---|---|---|---|
| 11,022,429 B2 | 6/2021 | Stull | |
| 2002/0186379 A1 | 12/2002 | Drake | |
| 2005/0004457 A1 | 1/2005 | Moilanen | |
| 2006/0052979 A1 | 3/2006 | Park | |
| 2006/0144147 A1 | 7/2006 | Ishimaru | |
| 2008/0006087 A1 | 1/2008 | Winter | |
| 2013/0160552 A1* | 6/2013 | Nakata | G01N 29/04 73/628 |
| 2013/0312529 A1* | 11/2013 | Park | G01H 9/00 73/657 |
| 2014/0208852 A1 | 7/2014 | Instanes | |
| 2015/0049343 A1 | 2/2015 | Shaked | |
| 2015/0300995 A1 | 10/2015 | Flynn | |
| 2019/0186898 A1 | 6/2019 | Stull | |
| 2019/0331820 A1 | 10/2019 | Goodman | |
| 2020/0191754 A1 | 6/2020 | Findikoglu | |

OTHER PUBLICATIONS

Alleyne, D. et al. "A two-dimensional Fourier transform method for the measurement of propagating multimode signals". J. Acoust. Soc. Am., vol. 89(3), Mar. 1991, pp. 1159-1168. (Year: 1991).

Flynn, E.B. et al. "High-speed, non-contact, baseline-free imaging of hidden defects using scanning laser measurements of steady-state ultrasonic vibration". Structural Health Monitoring 2013, 2013, pp. 1-8. (Year: 2013).

Kostli, Kornel P. et al. "Two-dimensional photoacoustic imaging by use of Fourier-transform image reconstruction and a detector with an anisotropic response". Applied Optics, vol. 42, No. 10, Apr. 1, 2003, pp. 1899-1908. (Year: 2003).

Moreau, Ludovic. "Monitoring ice thickness and elastic properties from the measurement of leaky guided waves: A laboratory experiment". J. Acoust. Soc. Am., vol. 142(5), Nov. 2017, pp. 2873-2880. (Year: 2017).

Schoonover, Robert W. et al. "Numerical investigation of the effects of shear waves in transcranial photoacoustic tomography with a planar geometry". Journal of Biomedical Optics, vol. 17(6), Jun. 2012, pp. 061215-1-061215-11. (Year: 2012).

* cited by examiner

_US 11,692,930 B2_

STANDOFF INSPECTION USING GEOMETRY-INFORMED FULL-WAVEFIELD RESPONSE MEASUREMENTS

ACKNOWLEDGEMENT OF GOVERNMENT SUPPORT

This invention was made with United States (U.S.) government support under Contract No. 89233218CNA000001 awarded by the U.S. Department of Energy. The U.S. government has certain rights in the invention.

PARTIES TO JOINT RESEARCH AGREEMENT

The research work described here was performed under a Cooperative Research and Development Agreement (CRADA) between Los Alamos National Laboratory (LANL) and Chevron under the LANL-Chevron Alliance, CRADA number LA05C10518.

TECHNICAL FIELD

The present disclosure relates generally to the field of inspecting structures using acoustic responses to acoustic excitation of the structures.

BACKGROUND

Steady acoustic response of a structure measured using laser acoustic wavenumber spectroscopy (LAWS) may be used to identify defects/damages to the structure. However, LAWS is limited to detecting defects/damages in flat structures and to evaluating the results of individual scans in isolation.

SUMMARY

This disclosure relates to inspecting structures using acoustic responses to acoustic excitations of the structures. A vibrometer may measure acoustic responses in portions of a structure along a scan path to acoustic excitation of the structure. A ranging device may measure distances to the portions of the structure along the scan path. A three-dimensional point cloud may be generated based on the acoustic responses in the portions of the structure, the distances to the portions of the structure, and/or other information. The three-dimensional point cloud may include points representing geometry of the portions of the structure. The points may be associated with the acoustic responses in corresponding portions of the structure. One or more properties of the structure may be determined based on an analysis of the three-dimensional point cloud and/or other information.

A system that inspects a structure may include one or more electronic storage, one or more vibrometers, one or more ranging devices, one or more processors and/or other components. The electronic storage may store information relating to structures, acoustic excitation of structures, acoustic responses in portions of structures, distances to portions of structures, scan paths, three-dimensional point clouds, analysis of three-dimensional point clouds, properties of structures, and/or other information.

In some implementations, a structure may include a hollow structure, a support structure, a moving structure, and/or other structure. A hollow structure may include a vehicle, a container, a pipe, and/or other hollow structure. A support structure may include an installation, a platform, a frame, a crane, a beam, and/or other support structure. A moving structure may include a turbine blade and/or other moving structure.

The vibrometer(s) may be configured to measure acoustic responses in portions of the structure along one or more scan paths to acoustic excitation of the structure. The ranging device(s) may be configured to measure distances to the portions of the structure along the scan path(s).

In some implementations, a vibrometer may include a laser Doppler vibrometer that measures the acoustic responses using a first laser beam. A ranging device may include a laser rangefinder that measures the distances using a second laser beam. The first laser beam and the second laser beam may be colinearly arranged using a beam combiner. A steering mirror may enable pitch movement of the first laser beam and the second laser beam. A 360-degree rotation stage may enable yaw movement of the first laser beam and the second laser beam.

In some implementations, a vibrometer may include a laser Doppler vibrometer that measures the acoustic responses using a laser beam. A steering mirror may enable pitch movement of the laser beam. A 360-degree rotation stage may enable yaw movement of the steering mirror. A ranging device may include a LiDAR device that measures the distances. The laser Doppler vibrometer and the LiDAR device may be separated by a distance and a direction. The acoustic responses measured by the laser Doppler vibrometer may be mapped to the distances measured by the LiDAR device based on the distance, the direction, and/or other information.

The processor(s) may be configured by machine-readable instructions. Executing the machine-readable instructions may cause the processor(s) to facilitate inspecting structures. The machine-readable instructions may include one or more computer program components. The computer program components may include one or more of a point cloud component, an analysis component, and/or other computer program components.

The point cloud component may be configured to generate one or more three-dimensional point clouds based on the acoustic responses in the portions of the structure, the distances to the portions of the structure, and/or other information. A three-dimensional point cloud may include points representing geometry of the portions of the structure. The points of the three-dimensional point cloud may be associated with the acoustic responses in corresponding portions of the structure.

The analysis component may be configured to determine one or more properties of the structure based on an analysis of the three-dimensional point cloud(s) and/or other information. In some implementations, the propert(ies) of the structure may include one or more defects in the structure. A defect in the structure may include material addition, material loss, material cracking, and/or other defect.

In some implementations, analysis of a three-dimensional point cloud may include: segmenting the three-dimensional point cloud into sections; performing perspective correction on one or more of the sections; determining one or more wave properties within the sections based on the acoustic responses within the sections and/or other information; and determining the propert(ies) of the structure based on the wave propert(ies) within the sections and/or other information. In some implementations, the three-dimensional point cloud may be segmented into the sections based on curvature of the portions of the structure and/or other information. In some implementations, the three-dimensional point cloud may be segmented into approximately planar sections.

In some implementations, different three-dimensional point clouds may be generated based on the acoustic responses and the distances measured at different times, and/or other information. For example, a first three-dimensional point cloud may be generated based on the acoustic responses, the distances measured at a first time, and/or other information. A second three-dimensional point cloud may be generated based on the acoustic responses, the distances measured at a second time subsequent to the first time, and/or other information. The acoustic responses measured at different times may be co-registered in space based on alignment of the first three-dimensional point cloud with the second three-dimensional point cloud, and/or other information. One or more changes to the structure may be determined based on the acoustic responses measured at different times and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to inspecting structures using acoustic responses to acoustic excitation of the structures. A ranging device and a vibrometer may be configured to measure distances to and acoustic responses to artificial or natural mechanical excitation of a structure (e.g., large structure) along a scan path. The distance and acoustic response measurements may be used to generate a three-dimensional point cloud of the acoustic response data. Portions (e.g., approximately planar sections) of the three-dimensional point cloud may be analyzed to inspect the condition of the corresponding portions of the structure. The analysis results may be mapped to the three-dimensional point cloud to form a three-dimensional representation of the structure condition (e.g., healthy, damage, defect) and measurement quality (e.g., signal to noise ratio (SNR) and line-of-site occlusions). The three-dimensional point cloud may enable co-registering in space of acoustic response measurements taken at different times and from different geometric perspectives.

Figure 1:
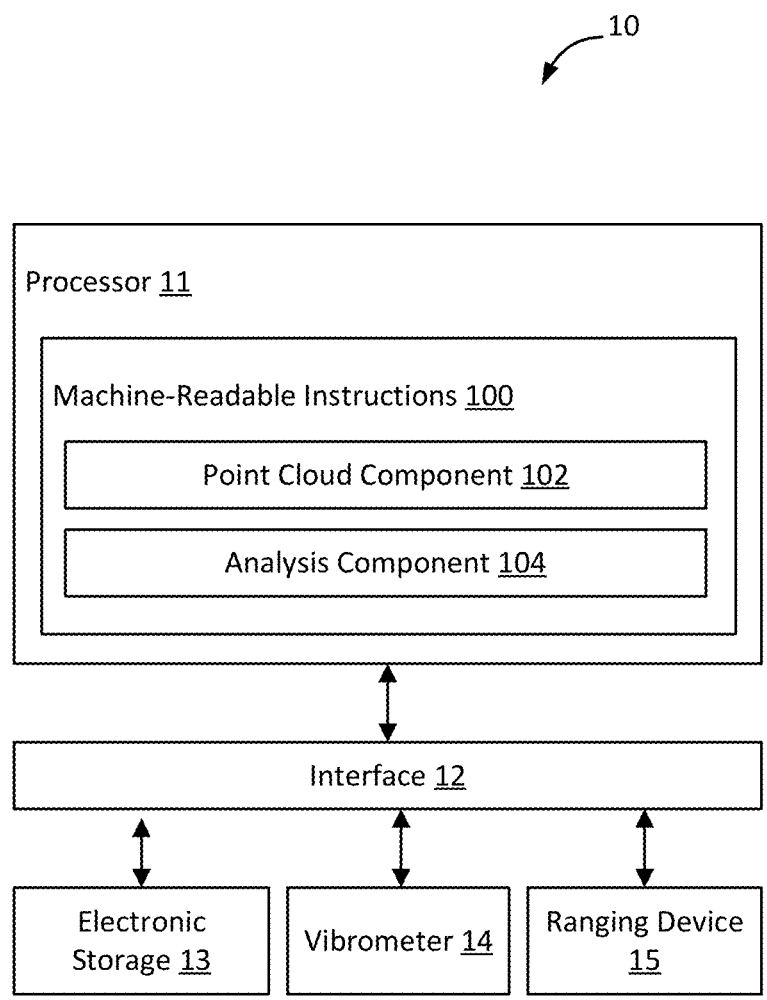
FIG. 1 illustrates an example system that inspects a structure.

The methods and systems of the present disclosure may be implemented by and/or in a computing system, such as a system 10 shown in FIG. 1. The system 10 may include one or more of a processor 11, an interface 12 (e.g., bus, wireless interface), an electronic storage 13, a vibrometer 14, a ranging device 15, and/or other components.

The vibrometer 14 may measure acoustic responses in portions of a structure along a scan path to acoustic excitation of the structure. The ranging device 15 may measure distances to the portions of the structure along the scan path. A three-dimensional point cloud may be generated by the processor 11 based on the acoustic responses in the portions of the structure, the distances to the portions of the structure, and/or other information. The three-dimensional point cloud may include points representing geometry of the portions of the structure. The points may be associated with the acoustic responses in corresponding portions of the structure. One or more properties of the structure may be determined based on an analysis of the three-dimensional point cloud and/or other information.

In some implementations, one or more components of the system 10 may be separate from the system 10. For example, the vibrometer 14 and/or the ranging device 15 may be separate from the system 10 and may be controlled by one or more processors separate from the processor 11. While the components of the system 10 are shown as single components, this is merely for example and is not meant to be limiting.

A structure may refer to arrangement and/or organization of one or more things. Thing(s) may be arranged and/or organized into a structure to perform one or more functions. A structure may be composed of a particular type of matter or a combination of different types of matter. For example, a structure may include a metallic, rigid structure and/or other structure. A structure may have a symmetrical shape or an asymmetrical shape. A structure may include one or more simple geometric shapes, one or more arbitrarily complex geometric shapes, and/or other geometric shapes.

In some implementations, a structure may include a hollow structure, a support structure, a moving structure, and/or other structure. A hollow structure may refer to a structure that includes one or more empty spaces within the structure. The empty space(s) may be used to hold, carry, transport, and/or otherwise interact with one or more things. For example, a hollow structure may include a vehicle, a container, a pipe, and/or other hollow structure. A support structure may refer to a structure that provides support for one or more things. For example, a support structure may include an installation, a platform, a frame, a crane, a beam, and/or other support structure. A moving structure may refer to a structure that moves to perform its function. For example, a moving structure may include a turbine blade and/or other moving structure. Non-limiting examples of structures include one or more parts or entirety of offshore floating production installations (such as spars, semisubmersibles, tension leg platforms), ship/barge hulls, offshore mobile drilling units, aircrafts, space launch vehicles, wind turbine blades, pressure vessels, piping systems, ballast tanks, void tanks, and cargo tanks. Other types of structures are contemplated.

Structures may be monitored to ensure that they are capable of performing their functions. For example, a structure may be inspected to determine whether the structure has developed any defects, such as material addition (e.g., coating, material sticking), material loss (e.g., corrosion, chipping), material cracking (e.g., in-plane cracking, out-of-plane cracking), and/or other defects.

Different properties of the structure (e.g., arrangements/organizations of matter in the structure) may cause different responses to acoustic excitation of the structure. For example, a particular type of defect in a structure may cause a particular type of acoustic responses in the corresponding part of the structure to acoustic excitation of the structure. The acoustic responses in the structure may be used to inspect the properties of the structure. For instance, wave propagation disturbances within the structure may be measured using a laser Doppler vibrometer and used to identify defects in the structures. However, such inspection of the structure may be limited to two-dimensional surfaces that are perpendicular to beams used to measure acoustic responses, may require repositioning of the laser Doppler vibrometer to capture measurements in 360 degrees (e.g., performing inspection from interior of the structure), may not facilitate comparison of measurements from multiple scans (results of scans are evaluated in isolation), and may not facilitate structural health monitoring of the entire structure, especially with large structures. Such limitations make it difficult to quantitatively track changes (e.g., degradation) of the structure over time.

To overcome these limitations, both distances to and acoustic responses to artificial or natural mechanical excitation of a structure (e.g., large structure) along a scan path may be measured. Distances to and acoustic responses may be measured by performing automated, 360 degree, three-dimensional acoustic scans without repositioning. For hollow structures, the measurements may be made from inside or outside the structures. The measured distances and acoustic responses may be used to generate a three-dimensional point cloud of the acoustic response data, and the three-dimensional point cloud may be analyzed to inspect the condition of the structure. The three-dimensional point cloud may facilitate perspective correction to account for non-perpendicular incidence of scanning beams on the structure to measure acoustic responses, may facilitate comparison of measurements from multiple scans, and may facilitate structural health monitoring of entire structure.

Acoustic excitation of a structure may refer to application of energy to the structure to generate acoustic responses in the structure. Energy (e.g., in form of sound, ultrasound, vibration) may be applied to the structure through one or more transducers coupled to the structure, one or more pulse lasers, and/or other excitation devices. An acoustic response may refer to presence of and/or propagation of one or more mechanical waves within the structure. That is, the structure may be acoustically excited to produce mechanical wave(s) within the structure. A mechanical wave may include a wave within the audible range and/or a wave above the audible range. For example, transducer(s) may be used to create a steady-state, single tone, ultrasonic excitation of the structure and ultrasonic responses in different portions of the structure may be measured and used to determine properties of the structure at corresponding portions. Use of the steady-state, single tone, ultrasonic excitation may enable ultrasonic response measurement to be performed quickly (e.g., scanning areas of a square-meter or more in seconds), without need for repetition, and from a large distance (e.g., tens of meters away). Other acoustic excitations of structures are contemplated.

The vibrometer 14 may include and/or refer to one or more devices that measure acoustic responses in a structure. The vibrometer 14 may be configured to measure acoustic responses in portions of the structure along one or more scan paths to acoustic excitation of the structure. An acoustic response may include a vibrational/wave response (e.g., full-wavefield response) in the audible range and/or above the audible range (ultrasonic response). For example, the vibrometer 14 may be configured to measure ultrasonic responses in portions of the structure along scan path(s) to ultrasonic excitation of the structure.

The vibrometer 14 may include one or more vibrographs and/or other devices that measure the amplitude and/or frequency of vibrations in a structure. The vibrometer 14 may measure acoustic responses using one or more beams. For example, the vibrometer 14 may include one or more laser Doppler vibrometers that uses a laser beam to measure acoustic responses in different portions of the structures. The acoustic responses may include the vibration/wave amplitude and/or frequency within the structure. A scan path may refer to a path traced and/or followed by the beam(s) of the vibrometer 14 along the structure.

Figure 3:
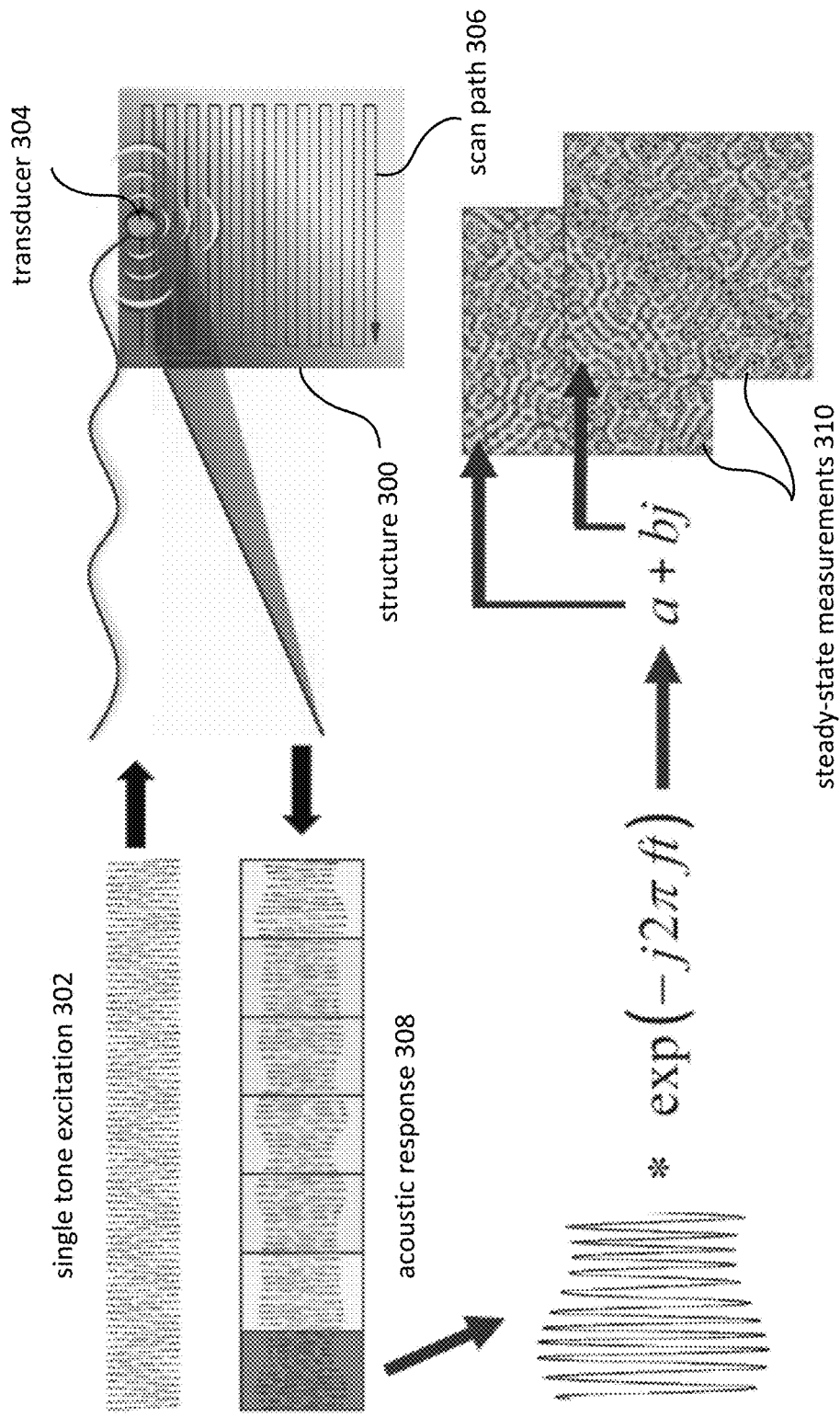
FIG. 3 illustrates example excitation and acoustic response of a structure.

For example, FIG. 3 illustrates example excitation and acoustic response of a structure. A transducer 304 may apply single tone excitation 302 to a structure 300 (e.g., two-dimensional plate). A vibrometer may measure acoustic response 308 in portions of the structure 300 along a scan path 306 to the acoustic excitation of the structure 300. The vibrometer may perform a raster scan to measure acoustic response 308 in portions of the structure 300. Different portions of the waveform of the acoustic response 308 may correspond to different portions of the structure 300. For example, the first portion of the waveform may correspond to the first portion of the structure 300 along the scan path 306. The acoustic response 308 at each scan point/area may be represented as a complex number (of amplitude and phase) through a Fourier transform. FIG. 3 illustrates steady state measurements 310 of the structure 300 as a function of position. The patterns of the steady state measurements 310 may illustrate amplitudes of the measurements as a function of position on the structure 300. The amplitudes may represent energy of the acoustic response 308 at a given time and position on the structure.

The ranging device 15 may include and/or refer to one or more devices that measure distances from an observation point to a target. The ranging device 15 may be configured to measure distances to the portions of the structure. The ranging device 15 may be configured to measure distances to the portions of the structure along the scan path(s) used by the vibrometer 14. Measurement of the distances to the portions of the structure may facilitate measurement and/or determination of the three-dimensional geometry of the structure. The ranging device 15 may measure distances using one or more laser beams. For example, the ranging device 15 may include one or more laser rangefinders, one or more LiDAR devices (devices that utilize LiDAR technique to measure distances), and/or other devices that use laser beams to measure distances to targets.

Figure 4A:
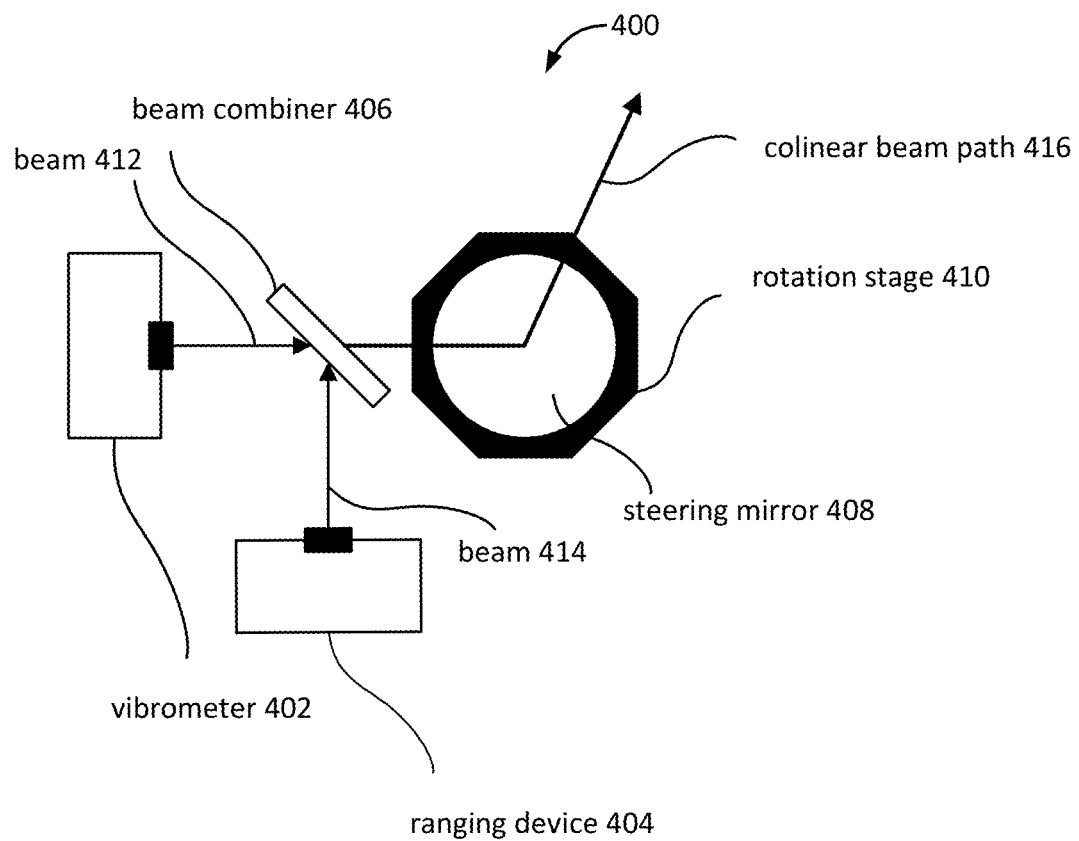
FIG. 4A illustrates an example configuration of a vibrometer and a ranging device
Figure 4B:
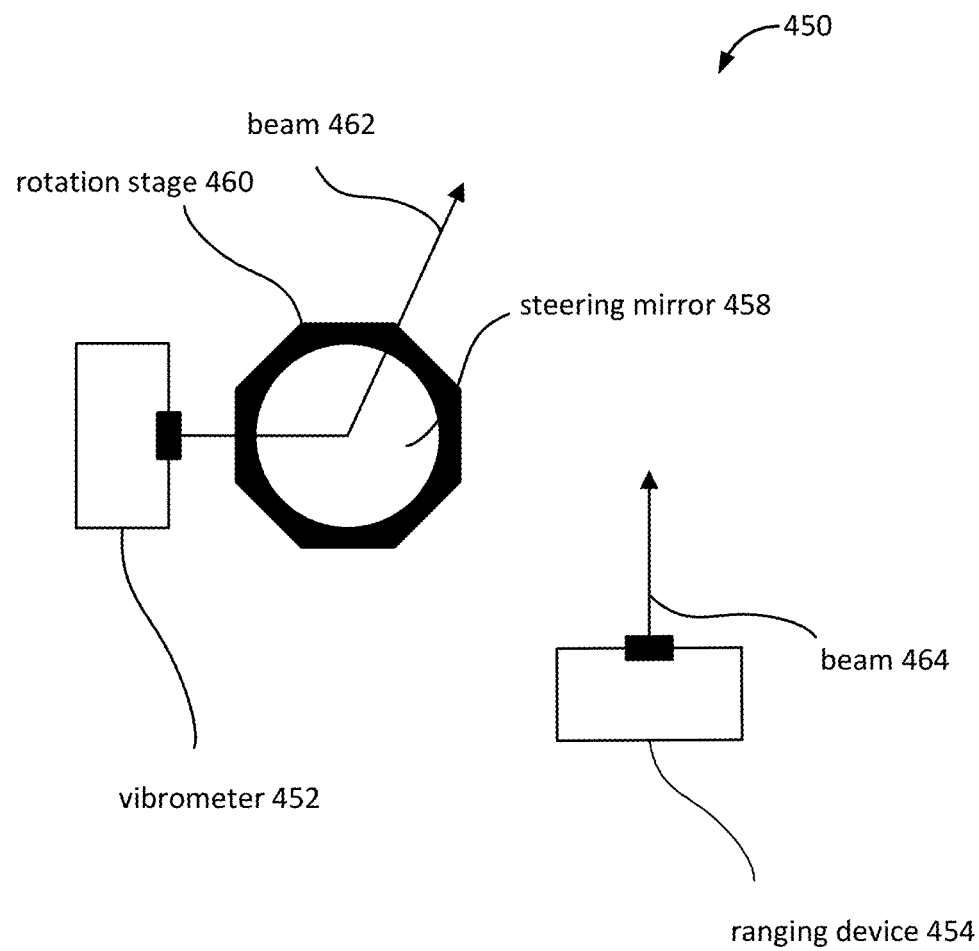
FIG. 4B illustrates an example configuration of a vibrometer and a ranging device.

FIGS. 4A and 4B illustrate example configurations 400, 450 of vibrometers and ranging devices. The configuration 400, 450 of vibrometers and ranging devices may enable automated scanning of acoustic responses in portions of structures to acoustic excitation and distances to the portions of the structures.

In FIG. 4A, the vibrometer 402 may include a vibrometer (e.g., a laser Doppler vibrometer) that measures the acoustic responses in portions of a structure along a scan path to acoustic excitation using a beam 412. The ranging device 404 may include a ranging device (e.g., a laser rangefinder) that measures the distances to the portions of the structure using a beam 414. The beam 412 used by the vibrometer 402 and the beam 414 used by the ranging device 404 may be collinearly arranged using a beam combiner 406. The beam combiner 406 may include and/or refer to one or more optical elements (e.g., partial reflectors, combinations of beam splitters and mirrors) that combine two or more wavelengths of light (e.g., one in transmission and one in reflection) onto a single beam path. The beam combiner 406 may cause the beam 412 and the beam 414 to travel along a colinear beam path 416.

A steering mirror 408 may be positioned in the colinear beam path 416. The steering mirror 408 may enable pitch movement (e.g., up and down) of the beam 412 and the beam 414. That is, the steering mirror 408 may enable changes in the pitch direction of the colinear beam path 416. The steering mirror 408 may be positioned on a rotation stage 410. The rotation stage 410 may include a 360-degree rotation stage with the capability to rotate in 360 degrees. The rotation stage 410 may enable yaw movement (e.g., right/clockwise rotation, left/counter-clockwise rotation) of the steering mirror 408 and the beams 412, 414. That is, the rotating stage 410 may enable changes in the yaw direction of the colinear beam path 416. Such configuration may enable acoustic response and distance measurement scans to be performed on variations locations of the structure (e.g., multiple regions of interest) without the need to reposition the vibrometer 402 or the ranging device 404.

Colinear arrangement of the beams 412, 414 may enable measurement of both acoustic responses and distances to same portions of the structure. That is, both acoustics responses and distances may be measured for portions of the structure along the colinear scan path of the beams 412, 414. The acoustic responses and distances to portions of the structure along the scan path may be measured simultaneously and/or sequentially. For instance, for individual portions (e.g., points, areas) of the structure along the scan path, the acoustic response measurement and the distance measurement may be made at the same time or one after another. For example, while the colinear beam path 416 is being moved vertically and/or laterally to trace the scan path, both the acoustic response measurement and the distance measurement may be simultaneously performed by the vibrometer 402 and the ranging device 404, respectively. As another example, as the collinear beam path 416 is changed to trace along the scan path, the acoustic response measurement and the distance measurement may be performed by the vibrometer 402 and the ranging device 404 for individual portions one after another. As another example, the colinear beam path 416 may be changed to trace along the scan path multiple times, and the acoustic response measurement and the distance measurement may be performed by the vibrometer 402 and the ranging device 404 during separate tracings along the scan path.

In FIG. 4B, the vibrometer 452 may include a vibrometer (e.g., a laser Doppler vibrometer) that measures the acoustic responses in portions of a structure along a scan path to acoustic excitation using a beam 462. The ranging device 454 may include a ranging device (e.g., a LiDAR device) that measures the distances to the portions of the structure using a beam 464. The beam 462 used by the vibrometer 452 and the beam 464 used by the ranging device 454 may not be collinearly arranged.

A steering mirror 458 may be positioned in the path of the beam 462. The steering mirror 458 may enable pitch movement (e.g., up and down) of the beam 462. That is, the steering mirror 458 may enable changes in the pitch direction of the path of the beam 462. The steering mirror 458 may be positioned on a rotation stage 460. The rotation stage 460 may include a 360-degree rotation stage with the capability to rotate in 360 degrees. The rotation stage 460 may enable yaw movement (e.g., right/clockwise rotation, left/counter-clockwise rotation) of the steering mirror 458 and the beam 462. That is, the rotating stage 460 may enable changes in the yaw direction of the path of the beam 462. The ranging device 454 may have its own steering mechanism to change the path of the beam 464. The steering mechanism of the ranging device 454 may be independent of the steering mechanism (e.g., the steering mirror 458, the rotation stage 460) of the vibrometer 452. Such configuration may enable acoustic response and distance measurement scans to be performed on variations locations of the structure (e.g., multiple regions of interest) without the need to reposition the vibrometer 452 or the ranging device 454.

The vibrometer 452 and the ranging device 454 may be separated by a distance and a direction (e.g., direction of the vibrometer 452 to the ranging device 454, or vice versa). The distance and the direction may define the relative positions/orientation of the vibrometer 452 and the ranging device 454. The acoustic responses measured by the vibrometer 452 may be mapped to the distances measured by the ranging device 454 (or vice versa) based on the relative positions/orientation of the vibrometer 452 and the ranging device 454, and other information. For example, an acoustic response measured by the vibrometer 452 and a distance measured by the ranging device 454 may be mapped to the same portion of the structure based on the distance between the vibrometer 452 and the ranging device 454, the direction from the vibrometer 452 to the ranging device 454 (or vice versa), and/or other information. Other configurations of vibrometers and ranging devices are contemplated.

Referring back to FIG. 1, the electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to structures, acoustic excitation of structures, acoustic responses in portions of structures, distances to portions of structures, scan paths, three-dimensional point clouds, analysis of three-dimensional point clouds, properties of structures, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate inspecting structures. The machine-readable instructions 100 may include one or more computer program components. The machine-readable instructions 100 may include one or more of a point cloud component 102, an analysis component 104, and/or other computer program components.

The point cloud component 102 may be configured to generate one or more three-dimensional point clouds based on the acoustic responses in the portions of the structure, the distances to the portions of the structure, and/or other information. A three-dimensional point cloud may refer to a collation of points (data points) defined by one or more coordinate systems. The three-dimensional point cloud may define the shape of one or more portions the structure. The locations of the points within the three-dimensional point cloud may reflect the shape of the structure. The three-dimensional point cloud may include points representing geometry of the portions of the structure. For example, the three-dimensional point cloud may include points that represent one or more surfaces of the structure.

The point cloud component 102 may determine locations of the points within a three-dimensional point cloud based on the distances to the portions of the structure and/or other information. The point cloud component 102 may use the distances to the portions of the structure to determine the geometries and/or shapes of the portions of the structure, and may determine locations of the point within the three-dimensional point cloud to represent the geometries and/or shapes of the portions of the structure. A scan path used to measure the distances may provide two-dimensional registration (horizontal and vertical angles) of individual distance measurements and the distance measurement may provide the distance to the portion. A portion of the structure corresponding to a single distance measurement may be represented by a single or multiple points within the three-dimensional point cloud. A portion of the structure corresponding to multiple distance measurements may be represented by a single or multiple points within the three-dimensional point cloud. For example, a single point within the three-dimensional point cloud may represent a 1 mm by 1 mm surface, and multiple distance measurements for the points/surface of the structure within the 1 mm by 1 mm surface may be combined (e.g., averaged) to determine a single distance value for the single point.

The point cloud component 102 may associate the points of the three-dimensional point cloud with the acoustic responses in corresponding portions of the structure. Thus, the geometry/shape of a portion of the structure may be represented by one or more points within the three-dimensional point cloud, with the point(s) being associated with the acoustic responses measured in the represented portion of the structure. A single acoustic response measurement may be associated with a single or multiple points within the three-dimensional point cloud. Multiple acoustic response measurements may be associated with a single or multiple points within the three-dimensional point cloud. For example, the acoustic response measurements for different portions of the structure may be recorded as an acoustic response measurement data stream. The data stream may be broken up into (equal-length) blocks that correspond to individual spherical-coordinate pixel in the scan region. A Fourier transform at the excitation frequency may be calculated for individual blocks and a complex value may be assigned to the corresponding pixel. This may result in a spherical map of complex acoustic response values that provide the amplitude and phase of the acoustic response at each point. The acoustic response values may be mapped to physical spatial coordinates using the three-dimensional point cloud generated from the distance measurement.

The analysis component 104 may be configured to determine one or more properties of the structure based on an analysis of the three-dimensional point cloud(s) and/or other information. An analysis of a three-dimensional point cloud may include one or more of examination, investigation, breakdown, processing, and/or other analysis of the information (e.g., geometry/shape of portions of a structure, acoustic responses in portions of the structure) conveyed by the three-dimensional point cloud. A property of a structure may refer to a physical attribute, quality, and/or characteristic of the structure. For example, a property of a structure may refer to one or more defects in the structure, thickness of the structure, arrangement of materials within the structure, and/or types of materials that makeup the structure. A defect in the structure may include material addition (e.g., coating, material sticking), material loss (e.g., corrosion, chipping), material cracking (e.g., in-plane cracking, out-of-plane cracking), and/or other defects. Other types of defects and properties of structures are contemplated.

Determination of a property of a structure may include identification of the property, quantification of the property, and/or other determination of the property of the structures. For example, the analysis component 104 may determine thickness of different portions of the structure based on an analysis of a three-dimensional point cloud for the structure. As another example, the analysis component 104 may determine the existence and/or absence of one or more defects in a structure based on an analysis of a three-dimensional point cloud for the structure. The analysis component 104 may determine the type of defect in the structure based on an analysis of a three-dimensional point cloud for the structure. The analysis component 104 may quantify (e.g., provide numbers that define) the defect in the structure based on an analysis of a three-dimensional point cloud for the structure. Other determinations of structural properties are contemplated.

The analysis component 104 may be configured to determine one or more properties of a portion of the structure based on one or more wave properties of the acoustic response within the portion of the structure, and/or other information. The analysis component may use the wave propert(ies) of the acoustic response within a particular portion of the structure to determine the propert(ies) of the particular portion of the structure. A wave property of an acoustic response may refer to a property of one or more mechanical waves generated within the structure based on acoustic excitation of the structure. Examples of wave properties include amplitude, wavelength, wavenumber, period, frequency, and speed. Other types of wave properties are contemplated.

For example, the analysis component 104 may be configured to determine propert(ies) of a portion of the structure based on wavenumber of the acoustic response within the portion of the structure. A wavenumber may refer to the spatial frequency of a wave. A wavenumber may represent a number of waves per unit distance. A wavenumber may be measured in cycles per unit distance and/or radians per unit distance. A wavenumber may be inverse of a wavelength. Different wavelengths may correspond to different properties of the structure. For example, changes in thickness, arrangement, and/or material of the structure may result in changes in wavelengths within the corresponding regions. Thus, different wavenumbers may correspond to different properties of the structure, and changes in thickness, arrangement, and/or material of the structure may result in changes in wavenumbers within the corresponding regions.

The analysis component 104 may be configured to determine the wavenumber of the acoustic response based on analysis of the acoustic response and/or other information.

For example, the wave field domain of the acoustic response (e.g., steady-state measurements) may be converted to wavenumber domain via a two-dimensional fast Fourier transform. Different wavenumber components may be exacted by passing through one or more wavenumber filter banks. Different wavenumber filter banks may correspond to different wavenumbers. For example, a particular filter bank may correspond to a particular wavenumber, and passing through the particular filter bank may result in waves with the particular wavenumber remaining while waves with other wavenumbers are filtered out. The amount of energy remaining within different portions of the structure after passing through the wavenumber filter banks may be used to determine the wavenumbers for the different portions of the structure.

Figure 5:
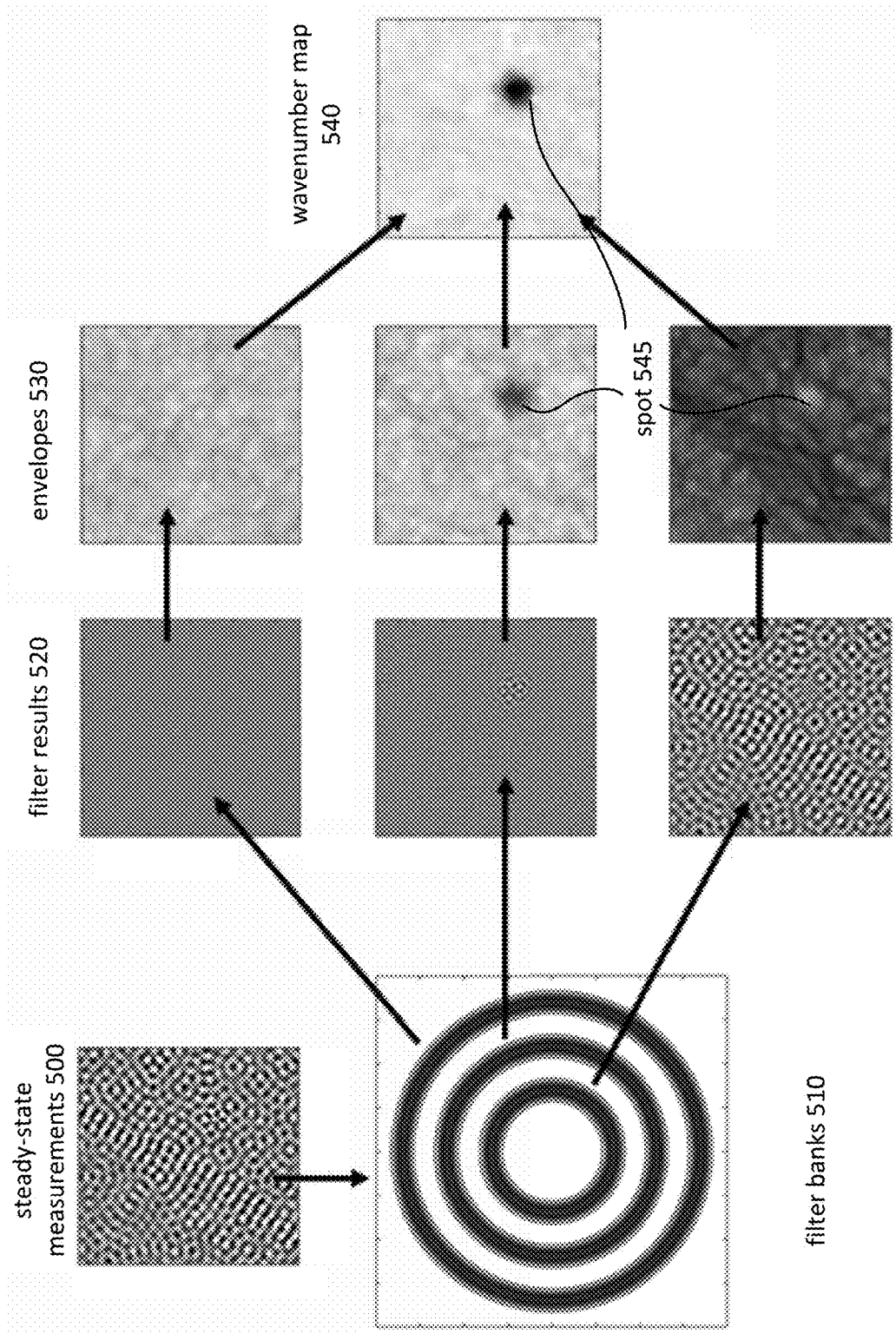
FIG. 5 illustrates an example procedure for wavenumber estimation.

FIG. 5 illustrates an example procedure for wavenumber estimation. Steady-state measurements 500 may be passed through filter banks 510. The filter banks 510 may include different filters for different wavenumbers. For example, the filter banks 510 may include three filters for three different wavenumbers. In FIG. 5, the largest filter may correspond to largest wavenumber (e.g., 15), the smallest filter may correspond to smallest wavenumber (e.g., 5), and the middle filter may correspond to an intermediate wavenumber (e.g., 10). Passing through the filter banks 510 may result in the filter results 520 having different densities of wave depending on the applied filter. Envelopes 530 may be generated from the filter results 520 and combined to generate a wavenumber map 540. Amount of energy left after passing through the filter banks 510 may be used to determine appropriate wavenumbers for different regions. For example, passing through the largest filter may not result in any spot in the envelopes 530 having higher/lower density of wave due to wave in none of the spots having wavenumber that matches the wavenumber (e.g., 15) corresponding to the largest filter. Passing through the middle filter (e.g., corresponding to an intermediate wavenumber of 10) may result in a spot 545 having higher density of wave. The spot 545 may have higher density of wave due to the wave in the spot 545 having wavenumber that matches the wavenumber (e.g., 10) corresponding to the middle filter. Passing through the smallest filter (e.g., corresponding to the smallest wavenumber of 5) may result in the spot 545 having lower density of wave. The spot 545 may have lower density of wave due to the wave in the spot 545 not having wavenumber that matches the wavenumber (e.g., 5) corresponding to the smallest filter.

Figure 6:
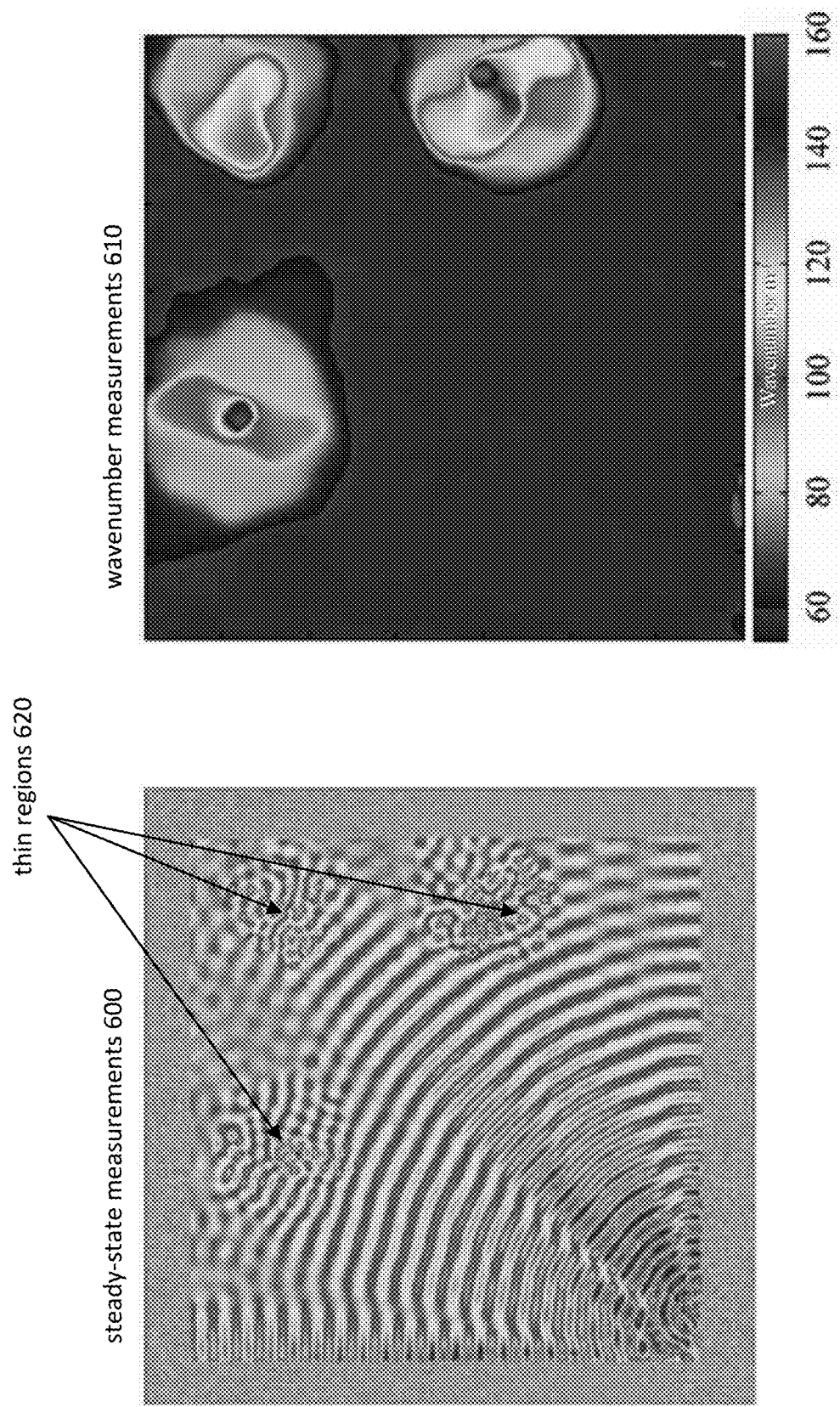
FIG. 6 illustrates example steady-state measurements and wavenumber measurements.

The amount of wavenumbers within a portion of the structure may be used to determine one or more properties within the portion. For example, FIG. 6 illustrates example steady-state measurements 600 and corresponding wavenumber measurements 610. The wavenumber measurements 610 may show that there are three areas within the portion of the structure with higher waver numbers than other areas within the portion. These areas with higher wavenumbers may correspond to thin regions 620 of the structure. Thus, the analysis component 104 may be configured to determine thickness/thinness of different portions of the structure based on the wavenumber of the acoustic response within the portions of the structure. In some implementations, determination of thickness/thinness of structure may be further performed based on amplitude/energy of wavenumbers and/or template matching.

Figure 7:
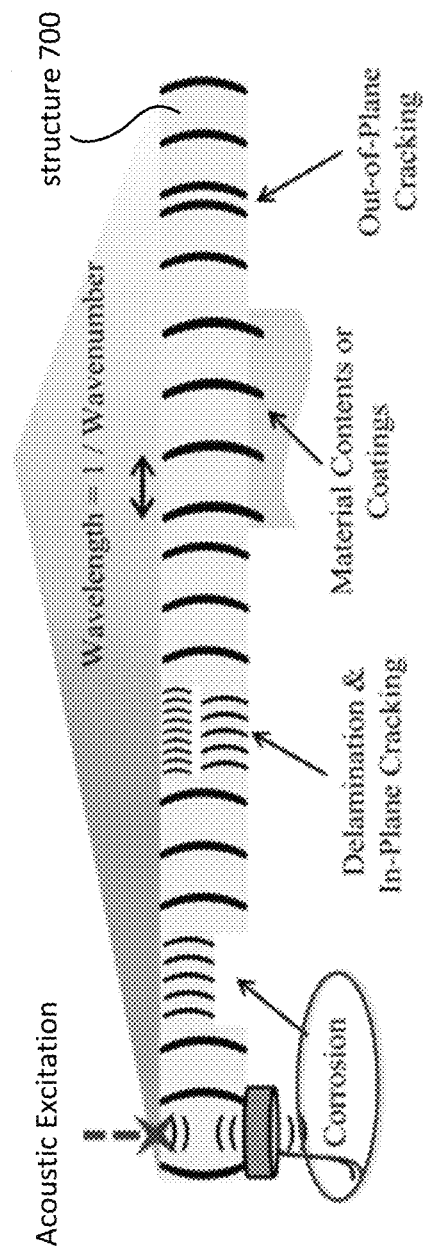
FIG. 7 illustrates example wavenumbers for different structural properties.

FIG. 7 illustrates example wavenumbers for different structural properties. An acoustic response may generate acoustic response within a structure 700. Different properties of the structure 700 may cause the acoustic response to have different wavelengths/wavenumbers within the structure. For example, corrosion (thinning) of the structure may cause the wavenumber to increase while material contents or coating (thickening) of the structure may cause the wavenumber to decrease. In-plane fracturing of the structure into layers (delamination and in-plane cracking) may result in wavenumbers to increase. The wavenumber increase may be different for different sides of the fracturing, with thinner side having greater wavenumber increase and the thicker side having smaller wavenumber increase. Out-of-plane fracturing of the structure (out-of-plane cracking) may cause a discontinuity wave and a region with out-of-plane fracturing may be surrounded by same wavenumber. Determination of other structural properties and use of other wave properties are contemplated.

In some implementations, one or more parts of an analysis of a three-dimensional point cloud may be limited to two dimensions. For example, wavenumber estimation for an area may assume that the area being analyzed is a flat plane that is perpendicular to the scanning system. For instance, the acoustic response measured by the vibrometer 14 may be assumed, for wavenumber estimation, to be measured from a flat plane structure with the beam of the vibrometer 14 being perpendicular to the flat plane structure. To analyze the three-dimensional point cloud using two-dimensional analysis, the analysis of the three-dimensional point cloud may include: (1) segmenting the three-dimensional point cloud into sections; (2) performing perspective correction on one or more of the sections; (3) determining one or more wave properties within the sections based on the acoustic responses within the sections and/or other information; and (4) determining the propert(ies) of the structure based on the wave propert(ies) within the sections and/or other information.

Segmenting the three-dimensional point cloud into sections may include adaptively piecewise fitting the three-dimensional point cloud into sections. In some implementations, the three-dimensional point cloud may be segmented into the sections based on curvature of the portions of the structure and/or other information. For example, the three-dimensional point cloud may be segmented into approximately planar sections such that, at maximum, the surface angles within individual sections do not vary by more than 90 degrees. The amount of variance may be changed to provide different estimations of wave properties and/or structural properties. For instance, it may be more practical to limit the variance of surface angles within individual sections to 20 degrees or less. Use of other curvatures are contemplated.

Different sizes of sections may provide different tradeoffs in terms of the analysis of the three-dimensional point cloud. Larger sections may provide faster analysis and higher resolution (e.g., more wave information) than smaller sections. Smaller sections may provide better geometric matching to the shape of the structure. In some implementations, the three-dimensional point cloud may be segmented based on desired size/range of sizes of the sections.

Performing perspective correction on a section may include compensating for acoustic response measurement using beams that are not perpendicular to the portion being scanned. That is, perspective correction may correct for beam angle of incidence that deviates from a line perpendicular to the portion of the structure. The orientation of individual (planar) sections relative to the scanning system may be determined/estimated using a least squares approach, and the relative perspective of the individual sections may be corrected using the orientations so that acoustic responses of the individual sections approximates the acoustic response that would have been measured at normal incidence. Performing perspective correction on the sections may result in higher accuracy in wave property/structural property determinations.

Determining wave propert(ies) within the sections based on the acoustic responses within the sections may include determining wave propert(ies) based on perspective-corrected acoustic responses within the sections. That is, wave propert(ies) within the sections may be determined using perspective-corrected acoustic response that approximates the acoustic response that would have been measured at normal incidence. For example, perspective-corrected wave lengths and/or perspective-corrected wavenumbers within the sections may be determined based on perspective-corrected acoustic responses within the sections.

Determining propert(ies) of the structure based on the wave propert(ies) within the sections may include determining structural propert(ies) (e.g., defect, thickness, material) based on perspective-corrected wave propert(ies) within the sections. That is, propert(ies) of the structure within the sections may be determined using perspective-corrected wave propert(ies). For example, defects, thickness, and/or material of the structure within the sections may be determined based on perspective-corrected wave lengths and/or perspective-corrected wavenumbers within the sections.

In some implementations, the wave propert(ies) and/or propert(ies) of the structure within the sections may be sequenced together to form a three-dimensional representation of wave propert(ies) and/or propert(ies) of the structure. For example, after local wavenumber estimates are performed within individual sections, the local wavenumbers may be sequenced together to form a three-dimensional wavenumber map. Such three-dimensional representation of wave propert(ies) and/or structural propert(ies) may enable viewing of measurements and/or analysis in three-dimensional space.

Figure 8:
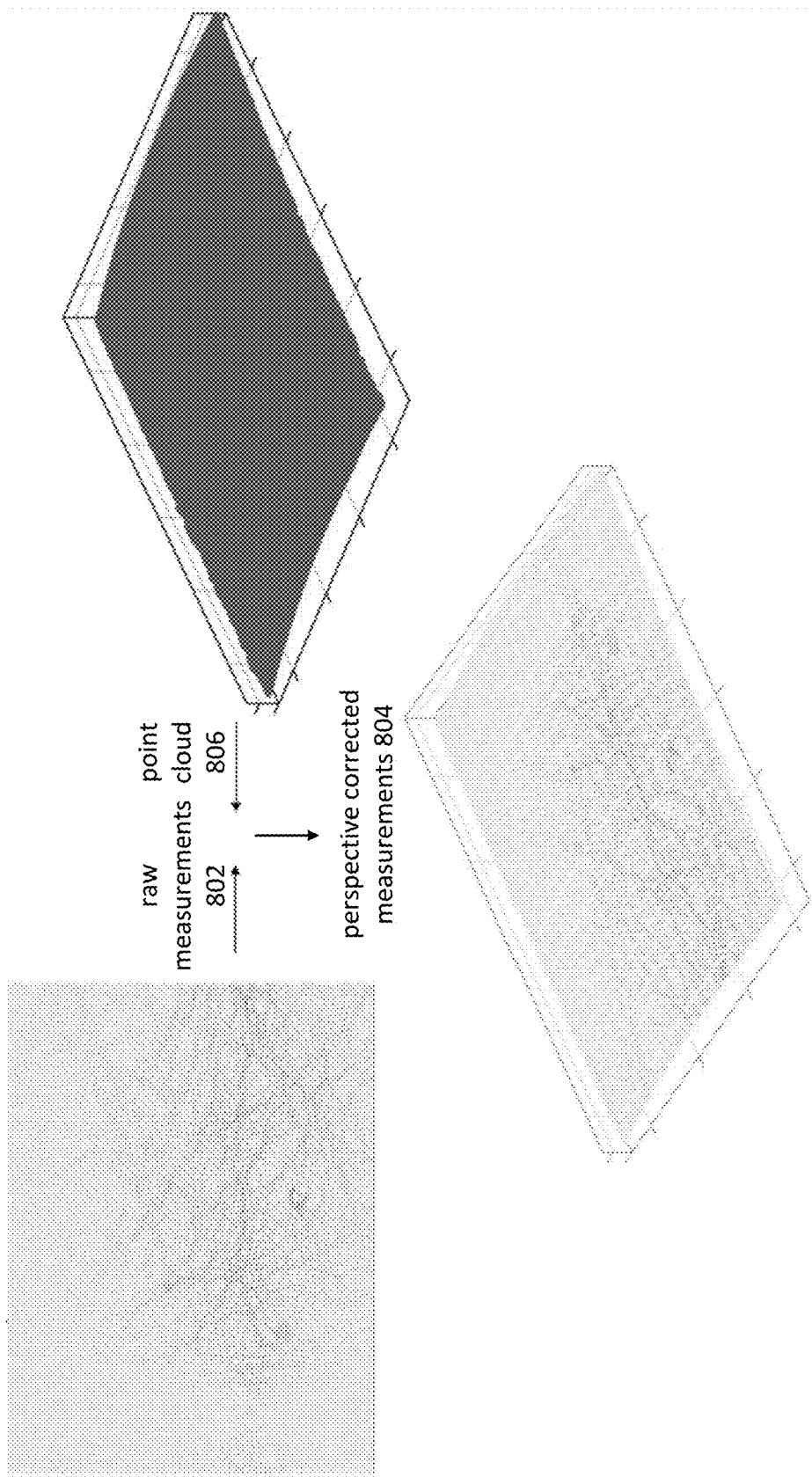
FIG. 8 illustrates example raw measurements and perspective-corrected measurements.

FIG. 8 illustrates example raw measurements 802 and perspective corrected measurements 804. The raw measurements 802 may include raw waveform (e.g., ultrasonic measurement) measured by a vibrometer. The raw measurements 802 may be mapped onto a point cloud 806 representing the three-dimensional geometry of the structure. The raw measurements 802 may be segmented into sections and individual sections may be perspective corrected to generate the perspective corrected measurements 804 (e.g., perspective corrected waveform).

Portion(s) of the raw measurements 802 may indicate that low acoustic response was measured in the corresponding portion(s) of the structure. Low acoustic response may have been measured due to actual low acoustic response in the corresponding portion of the structure and/or one or more interferences with measurement of the acoustic response. For example, measured acoustic response in a portion of the structure may be lower than the actual acoustic response in the portion due to lack of/poor reflection of the measuring beam from the portion. The lack of/poor reflection may be caused by poor angle of measuring beam incidence (angle of incidence deviating from normal incidence), long distance between the portion of the structure and the scanning system, reflective quality of the structure (e.g., due to coating, structure material), and/or other reasons.

In some implementations, measurement quality of the scanning system may be determined, and poor measurements of the acoustic response may be filtered out from analysis. Using poor measurements of the acoustic response may result in inaccurate determination of properties (e.g., defects, thicknesses, material) of the structure. Quality of acoustic response measurement may be highly dependent on how much light/measuring beam scatters off the structure and returns to the scanning system (e.g., a vibrometer). To assess measurement quality of the acoustic response scanning, signal to noise ratio may be calculated for individual (planar) sections. Signal may be determined by isolating the dominant wave model of the acoustic response in the wavenumber domain, and then compared to the remaining values in the wavenumber domain, which may be considered noise. Sections in which the scan did not provide sufficient signal quality for wave-property (e.g., wavenumber) estimation may be determined via thresholding, and these low signal-to-ratio section may be filtered out of the analysis. For example, if signal-to-noise ratio satisfies a threshold value (e.g., above −3 dB), the measurement may be considered clear enough for analysis to perform wave-property estimation. If the signal-to-noise ratio does not satisfy a threshold value (e.g., below −3 dB), the measurement may be considered poor and wave-property estimation may not be performed. In some implementations, portions of the structure with poor measurements may be scanned again (e.g., using lower scan rate, from different perspective, from different distance) to obtain higher quality scans.

The three dimensional information of the structure obtained from the ranging device 15 may be used to align different distance and/or acoustic response scans of the same structure. For example, three-dimensional point clouds, three-dimensional representations of wave propert(ies), and/or three-dimensional representations of structural propert(ies) generated from scans taken at different times and/or from different geometric perspectives may be co-registered in space.

For example, different three-dimensional point clouds may be generated for the same structure based on acoustic responses and distances measured at different times, and/or other information. For example, a first three-dimensional point cloud may be generated for a structure based on the acoustic responses and the distances measured at a first time, and/or other information. A second three-dimensional point cloud may be generated for the structure based on the acoustic responses and the distances measured at a second time subsequent to the first time, and/or other information. The acoustic responses measured at different times may be co-registered in space based on alignment of the first three-dimensional point cloud with the second three-dimensional point cloud, and/or other information. For example, one or both of the three-dimensional point clouds may be shifted and/or rotated to (maximally) fit/align the shapes/geometries defined by the three-dimensional point clouds.

Such co-registering of the acoustic responses measured at different times may be used to track changes to the structure over time. For example, progression of defects to the structure may be tracked using co-registering of the acoustic responses measured at different times. One or more changes to the structure may be determined based on the acoustic responses measured at different times and/or other information. For example, changes to thickness and/or development of defects in the structure between the first time and second time may be determined based on comparison of structural properties of the structure determined based on acoustic responses measured at different times. For instance, scans may be performed by the scanning system (e.g., the vibrometer 14, the ranging device 15) on some part(s) or entirety of the structure from the same location at a specified time interval and compared to each other. Differences in the scans may be computed to highlight the changes to the structure, such as expansion of defect (e.g., damage) to the structure. The time interval between the scans and the defect changes to the structure may be used to determine/estimate the rate of change (e.g., defect propagation rate) to the structure.

As another example, different three-dimensional point cloud may be generated for different parts of the same structure based on acoustic responses and distances measured from different geometric perspectives (e.g., different orientations, distance, directions between the structure and the scanning system), and/or other information. The acoustic responses and the distances may be measured by the same scanning system that is repositioned to scan the structure from different geometric perspectives and/or by separate scanning systems that are positioned differently with respect to the structure. For example, a first three-dimensional point cloud may be generated for a structure based on the acoustic responses and the distances measured from a first geometric perspective, and/or other information. A second three-dimensional point cloud may be generated for the structure based on the acoustic responses and the distances measured from a second geometric perspective different from the first geometric perspective, and/or other information. The acoustic responses measured from different geometric perspectives may be co-registered in space based on alignment of the first three-dimensional point cloud with the second three-dimensional point cloud, and/or other information. For example, one or both of the three-dimensional point clouds may be shifted and/or rotated to fit/align overlapping shapes/geometries defined by the three-dimensional point clouds.

Such co-registering of the acoustic responses measured from different geometric perspective may be used to determine properties of a structure that cannot be adequately scanned from a single geometric perspective. For example, a structure may be too large, and the range of the scanning system may not be long enough to adequately scan the structure. Different parts of the structure may be scanned separately from different geometric perspectives, and scans from different geometric perspectives may be combined to generate a three-dimensional representation of the entire structure.

Implementations of the disclosure may be made in hardware, firmware, software, or any suitable combination thereof. Aspects of the disclosure illustrated in FIG. 1 may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 in FIG. 1 may be provided by external resources not included in the system 10. External resources may include hosts/sources of information, computing, and/or processing and/or other providers of information, computing, and/or processing outside of the system 10.

Although the processor 11, the electronic storage 13, the vibrometer 14, and the ranging device 15 are shown to be connected to the interface 12 in FIG. 1, any communication medium may be used to facilitate direct and/or indirect interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
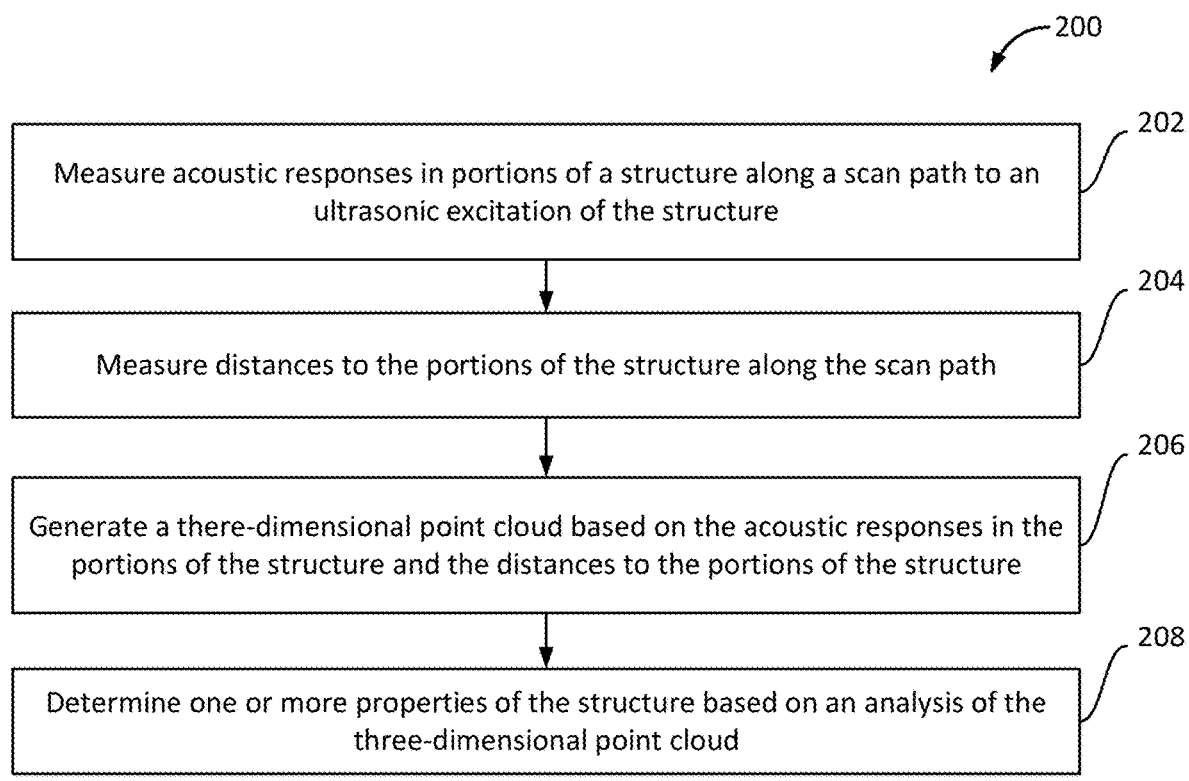
FIG. 2 illustrates an example method for inspecting a structure.

FIG. 2 illustrates method 200 for inspecting a structure. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, one or more operations of the method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, acoustic responses in portions of a structure along a scan path to acoustic excitation of the structure may be measured. In some implementation, operation 202 may be performed by a component the same as or similar to the vibrometer 14 (Shown in FIG. 1 and described herein).

At operation 204, distances to the portions of the structure along the scan path may be measured. In some implementation, operation 204 may be performed by a component the same as or similar to the ranging device 15 (Shown in FIG. 1 and described herein).

At operation 206, a three-dimensional point cloud may be generated based on the acoustic responses in the portions of the structure, the distances to the portions of the structure, and/or other information. The three-dimensional point cloud may include points representing geometry of the portions of the structure. The points may be associated with the acoustic responses in corresponding portions of the structure. In some implementation, operation 206 may be performed by a component the same as or similar to the point cloud component 102 (Shown in FIG. 1 and described herein).

At operation 208, one or more properties of the structure may be determined based on an analysis of the three-dimensional point cloud and/or other information. In some implementation, operation 208 may be performed by a component the same as or similar to the analysis component 104 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for inspecting a structure, the system comprising:
   a vibrometer configured to measure acoustic responses in portions of the structure along a scan path to acoustic excitation of the structure;
   a ranging device configured to measure distances to the portions of the structure along the scan path; and
   one or more physical processors configured by machine-readable instructions to:
      generate a three-dimensional point cloud based on the acoustic responses in the portions of the structure and the distances to the portions of the structure, the three-dimensional point cloud including points representing geometry of the portions of the structure, the points associated with the acoustic responses in corresponding portions of the structure; and
      identify one or more defects in the structure based on an analysis of the three-dimensional point cloud, wherein the identification of the one or more defects in the structure based on the analysis of the three-dimensional point cloud includes:
         determination of wavefield spatial patterns in the portions of the structure based on the acoustic responses within the portions as indicated by the three-dimensional point cloud; and
         identification of the one or more defects in the structure based on the wavefield spatial patterns in the portions of the structure.

2. The system of claim 1, wherein the analysis of the three-dimensional point cloud includes:
   segmenting the three-dimensional point cloud into sections;
   performing perspective correction on one or more of the sections;
   determining the wavefield spatial patterns within the sections based on the acoustic responses within the sections; and
   determining the one or more defects in the structure based on the wavefield spatial patterns within the sections.

3. The system of claim 2, wherein the three-dimensional point cloud is segmented into the sections based on curvature of the portions of the structure.

4. The system of claim 1, wherein the wavefield spatial patterns include wavenumbers.

5. The system of claim 1, wherein the one or more defects in the structure include material addition, material loss, material cracking, material property change, or structural property change.

6. The system of claim 1, wherein the structure includes a hollow structure, a support structure, or a moving structure.

7. The system of claim 6, wherein:
the hollow structure includes a vehicle, a container, or a pipe;
the support structure includes an installation, a platform, a frame, a crane, or a beam; and
the moving structure includes a turbine blade.

8. The system of claim 1, wherein:
a first three-dimensional point cloud is generated based on the acoustic responses and the distances measured at a first time;
a second three-dimensional point cloud is generated based on the acoustic responses and the distances measured at a second time subsequent to the first time;
the acoustic responses measured at different times are co-registered in space based on alignment of the first three-dimensional point cloud with the second three-dimensional point cloud; and
development of and/or changes to defects in the structure are determined based on the acoustic responses measured at different times that are co-registered in space.

9. The system of claim 1, wherein:
the vibrometer includes a laser Doppler vibrometer that measures the acoustic responses using a first laser beam;
the ranging device includes a laser rangefinder that measures the distances using a second laser beam;
the first laser beam and the second laser beam are collinearly arranged using a beam combiner;
a steering mirror enables pitch movement of the first laser beam and the second laser beam; and
a 360-degree rotation stage enables yaw movement of the first laser beam and the second laser beam.

10. The system of claim 1, wherein:
the vibrometer includes a laser Doppler vibrometer that measures the acoustic responses using a laser beam;
a steering mirror enables pitch movement of the laser beam;
a 360-degree rotation stage enables yaw movement of the steering mirror;
the ranging device includes a LiDAR device that measures the distances;
the laser Doppler vibrometer and the LiDAR device are separated by a distance and a direction; and
the acoustic responses measured by the laser Doppler vibrometer are mapped to the distances measured by the LiDAR device based on the distance and the direction.

11. A method for inspecting a structure, the method comprising:
measuring acoustic responses in portions of the structure along a scan path to acoustic excitation of the structure;
measuring distances to the portions of the structure along the scan path;
generating a three-dimensional point cloud based on the acoustic responses in the portions of the structure and the distances to the portions of the structure, the three-dimensional point cloud including points representing geometry of the portions of the structure, the points associated with the acoustic responses in corresponding portions of the structure; and
identifying one or more defects in the structure based on an analysis of the three-dimensional point cloud, wherein identifying the one or more defects in the structure based on the analysis of the three-dimensional point cloud includes:
determining wavefield spatial patterns in the portions of the structure based on the acoustic responses within the portions as indicated by the three-dimensional point cloud; and
identifying the one or more defects in the structure based on the wavefield spatial patterns in the portions of the structure.

12. The method of claim 11, wherein the analysis of the three-dimensional point cloud includes:
segmenting the three-dimensional point cloud into sections;
performing perspective correction on one or more of the sections;
determining the wavefield spatial patterns within the sections based on the acoustic responses within the sections; and
determining the one or more defects in the structure based on the wavefield spatial patterns within the sections.

13. The method of claim 12, wherein the three-dimensional point cloud is segmented into the sections based on curvature of the portions of the structure.

14. The method of claim 11, wherein the wavefield spatial patterns include wavenumbers.

15. The method of claim 11, wherein the one or more defects in the structure include material addition, material loss, material cracking, material property change, or structural property change.

16. The method of claim 11, wherein the structure includes a hollow structure, a support structure, or a moving structure.

17. The method of claim 16, wherein:
the hollow structure includes a vehicle, a container, or a pipe;
the support structure includes an installation, a platform, a frame, a crane, or a beam; and
the moving structure includes a turbine blade.

18. The method of claim 11, wherein:
a first three-dimensional point cloud is generated based on the acoustic responses and the distances measured at a first time;
a second three-dimensional point cloud is generated based on the acoustic responses and the distances measured at a second time subsequent to the first time;
the acoustic responses measured at different times are co-registered in space based on alignment of the first three-dimensional point cloud with the second three-dimensional point cloud; and
development of and/or changes to defects in the structure are determined based on the acoustic responses measured at different times that are co-registered in space.

19. The method of claim 11, wherein:
the acoustic responses are measured by a laser Doppler vibrometer using a first laser beam;
the distances are measured by a laser rangefinder using a second laser beam;
the first laser beam and the second laser beam are collinearly arranged using a beam combiner;
a steering mirror enables pitch movement of the first laser beam and the second laser beam; and
a 360-degree rotation stage enables yaw movement of the first laser beam and the second laser beam.

20. The method of claim 11, wherein:
the acoustic responses are measured by a laser Doppler vibrometer using a laser beam;
a steering mirror enables pitch movement of the laser beam;

a 360-degree rotation stage enables yaw movement of the steering mirror;
the distances are measured by a LiDAR device;
the laser Doppler vibrometer and the LiDAR device are separated by a distance and a direction; and
the acoustic responses measured by the laser Doppler vibrometer are mapped to the distances measured by the LiDAR device based on the distance and the direction.

* * * * *